(12) United States Patent
Cho et al.

(10) Patent No.: US 11,881,556 B2
(45) Date of Patent: Jan. 23, 2024

(54) NON-AQUEOUS ELECTROLYTE INCLUDING ADDITIVE FOR NON-AQUEOUS ELECTROLYTE, AND LITHIUM SECONDARY BATTERY INCLUDING THE NON-AQUEOUS ELECTROLYTE

(71) Applicant: LG Energy Solution, Ltd., Seoul (KR)

(72) Inventors: Yoon Gyo Cho, Daejeon (KR); Jeong Woo Oh, Daejeon (KR); Chul Haeng Lee, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 18/153,682

(22) Filed: Jan. 12, 2023

(65) Prior Publication Data

US 2023/0238580 A1  Jul. 27, 2023

(30) Foreign Application Priority Data

Jan. 13, 2022 (KR) ........................ 10-2022-0005270

(51) Int. Cl.
| | |
|---|---|
| H01M 10/0567 | (2010.01) |
| H01M 10/0568 | (2010.01) |
| H01M 10/0569 | (2010.01) |
| H01M 10/0525 | (2010.01) |
| H01M 4/485 | (2010.01) |
| H01M 4/02 | (2006.01) |

(52) U.S. Cl.
CPC ....... *H01M 10/0567* (2013.01); *H01M 4/485* (2013.01); *H01M 10/0525* (2013.01); *H01M 10/0568* (2013.01); *H01M 10/0569* (2013.01); *H01M 2004/027* (2013.01); *H01M 2300/0034* (2013.01); *H01M 2300/0051* (2013.01)

(58) Field of Classification Search
CPC ............ H01M 10/0567; H01M 4/485; H01M 10/0525; H01M 10/0568; H01M 10/0569; H01M 2004/027; H01M 2300/0034; H01M 2300/0051; H01M 4/505; H01M 4/525; H01M 4/386; H01M 4/48; H01M 10/052; H01M 10/4235; H01M 2300/0082; Y02E 60/10; C08F 216/1408; C08F 216/1458
USPC ....................................................... 429/341
See application file for complete search history.

(56) References Cited

U.S. PATENT DOCUMENTS

| | | | |
|---|---|---|---|
| 2004/0097675 A1 | 5/2004 | Ameduri et al. | |
| 2005/0233221 A1 | 10/2005 | Araki et al. | |
| 2009/0111028 A1 | 4/2009 | Lee et al. | |
| 2009/0291369 A1 | 11/2009 | Araki et al. | |
| 2010/0278715 A1 | 11/2010 | Khe | |
| 2016/0190641 A1 | 6/2016 | Lee et al. | |
| 2019/0190070 A1 | 6/2019 | Ji et al. | |
| 2019/0260031 A1 | 8/2019 | Kim et al. | |
| 2019/0377218 A1 | 12/2019 | Liu et al. | |
| 2020/0091554 A1* | 3/2020 | Matsuoka | H01M 4/13 |
| 2021/0257660 A1 | 8/2021 | Ahn et al. | |
| 2022/0021027 A1 | 1/2022 | Huang et al. | |

FOREIGN PATENT DOCUMENTS

| | | |
|---|---|---|
| CN | 111799444 A | 10/2020 |
| JP | 2004526000 A | 8/2004 |
| JP | 2004349240 A | 12/2004 |
| JP | 2013122901 A | 6/2013 |
| JP | 2015044779 A | 3/2015 |
| JP | 2018113167 A | 7/2018 |
| JP | 2019211719 A | 12/2019 |
| KR | 20090042592 A | 4/2009 |
| KR | 20140035793 A | 3/2014 |
| KR | 20160079574 A | 7/2016 |
| KR | 20180018106 A | 2/2018 |
| KR | 101884568 B1 | 8/2018 |
| KR | 20190041931 A | 4/2019 |
| KR | 20190101518 A | 9/2019 |
| KR | 20200029372 A | 3/2020 |

* cited by examiner

*Primary Examiner* — Gary D Harris
(74) *Attorney, Agent, or Firm* — Lerner David LLP

(57) ABSTRACT

The present disclosure provides a non-aqueous electrolyte including an additive including a repeating unit represented by Formula 1 and a repeating unit represented by Formula 2 below:

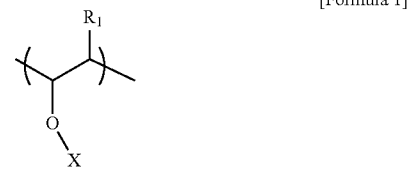

[Formula 1]

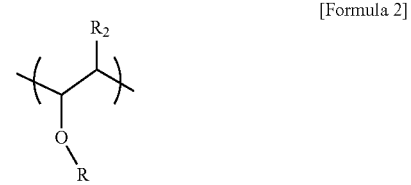

[Formula 2]

wherein X, R, $R_1$ and $R_2$ are described herein.

15 Claims, No Drawings

NON-AQUEOUS ELECTROLYTE INCLUDING ADDITIVE FOR NON-AQUEOUS ELECTROLYTE, AND LITHIUM SECONDARY BATTERY INCLUDING THE NON-AQUEOUS ELECTROLYTE

CROSS-REFERENCE TO RELATED APPLICATIONS

This application claims the priority from Korean Patent Application No. 10-2022-0005270 filed on Jan. 13, 2022, the disclosure of which is incorporated herein by reference.

BACKGROUND OF THE INVENTION

The present disclosure relates to a non-aqueous electrolyte including an additive for a non-aqueous electrolyte, and a lithium secondary battery including the non-aqueous electrolyte.

Recently, as application fields of a lithium secondary battery have rapidly expanded to not only the power supply of electronic devices such as electricity, electronics, communications, and computers but also the power storage supply of large-area devices such as automobiles and power storage devices, a demand for a secondary battery having high capacity, high output, and high stability has been increasing.

In particular, in a lithium secondary battery for automobiles, high capacity, high output, and long-term service life characteristics have been becoming important. In order to increase the capacity of the secondary battery, a high-nickel positive electrode active material having high energy density but low stability can be used, or the secondary battery can be driven with a high voltage.

However, when the secondary battery is driven under the above conditions, as charge and discharge proceeds, the surface structure of an electrode or a film formed on the surface of positive/negative electrode deteriorates due to a side reaction caused by the deterioration of an electrolyte, and thus transition metal ions may be eluted from the surface of the positive electrode. As described above, since the eluted transition metal ions are electro-deposited on the negative electrode, and reduce passivation ability of a solid electrolyte interphase (SEI), there occurs a problem in that the negative electrode is deteriorated.

This deterioration phenomenon of the secondary battery tends to be further accelerated when the potential of the positive electrode is increased or when the battery is exposed to high temperatures.

In addition, when the lithium ion battery is continuously used for a long period of time or left to stand at high temperatures, gas is generated, thereby causing a so-called swelling phenomenon in which the thickness of the battery increases, and it is known that the amount of gas generated in this case depends on the state of the SEI.

Therefore, in order to solve such problems, research and development on methods capable of suppressing the elution of metal ions from the positive electrode and forming a stable SEI film on the negative electrode, thereby reducing the swelling phenomenon of the secondary battery and increasing the stability at high temperatures have been attempted.

BRIEF SUMMARY OF THE INVENTION

An aspect of the present disclosure provides an additive for a non-aqueous electrolyte capable of suppressing the degradation of a positive electrode, reducing side reactions between a positive electrode and an electrolyte, and forming a stable SEI film on a negative electrode.

Another aspect of present disclosure provides a non-aqueous electrolyte having improved stability at high temperatures by including the additive for a non-aqueous electrolyte.

Another aspect of the present disclosure provides a lithium secondary battery having improved overall performance by including the non-aqueous electrolyte, thereby having improved high-temperature cycle characteristics and high-temperature storage characteristics.

According to an aspect of the present disclosure, there is provided a non-aqueous electrolyte including an additive for a non-aqueous electrolyte, the additive including a repeating unit represented by Formula 1 and Formula 2 below:

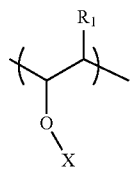

[Formula 1]

In Formula 1 above, X is a perfluoroalkyl group having 1 to 10 carbon atoms, and $R_1$ is any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group.

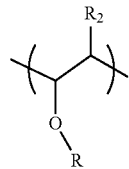

[Formula 2]

In Formula 2 above, R is an alkyl group having 1 to 10 carbon atoms which is substituted with at least one nitrile group, and $R_2$ is any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group.

According to another aspect of the present disclosure, there is provided a lithium secondary battery including the non-aqueous electrolyte.

A polymer, which is provided as an additive for a non-aqueous electrolyte and contains a repeating unit represented by Formula 1 and Formula 2, is capable of forming an elastic and robust solid electrolyte interphase (SEI) film on the surface of a negative electrode. Therefore, it is possible to prevent the negative electrode from deteriorating by maintaining the robust SEI layer even at high temperatures, and suppress an additional SEI formation reaction by solvent decomposition during cycles.

In addition, the polymer, which is provided as the additive for a non-aqueous electrolyte of the present disclosure, includes a perfluoroalkyl group in the repeating unit of Formula 1, thereby a LiF inorganic material is easily produced, and thus it is possible to form a stable polymer-inorganic material-based SEI layer.

Moreover, the polymer, which is provided as the additive for a non-aqueous electrolyte of the present disclosure, includes a nitrile group in the repeating unit of Formula 2, and thus is well electro-deposited on a negative electrode, so that the SEI layer may be easily formed.

Therefore, when the non-aqueous electrolyte of the present disclosure including the polymer provided as the additive for a non-aqueous electrolyte of the present disclosure is used, it is possible to form an electrode-electrolyte interface which is stable and has strong durability even at high temperatures, and thus high-temperature cycle characteristics and high-temperature storage characteristics are improved, so that a lithium secondary battery with improved overall performance may be achieved.

DETAILED DESCRIPTION OF THE INVENTION

It will be understood that terms or words used in the present specification and claims shall not be construed as being limited to having meanings defined in commonly used dictionaries, but should be interpreted as having meanings and concepts consistent with the technical idea of the present disclosure based on the principle that an inventor may appropriately define concepts of the terms to best explain the disclosure.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

Also, the expressions "a" and "b" in the description of "a to b carbon atoms" in the specification each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, —$CH_2$—, —$CH_2CH_2$—, —$CH_2CH_2CH_2$—, —$CH_2CH(CH_3)$—, —$CH(CH_3)$ $CH_2$—, —$CH(CH_3)$ $CH_2CH_2$—, and the like.

Furthermore, in the present specification, the expression "alkyl group" denotes a branched or unbranched monovalent saturated hydrocarbon group.

In addition, in the present specification, an alkyl group, an alkenyl group, an alkynyl group, an alkoxy group, a cycloalkyl group, a cycloalkenyl group and an aryl group may be substituted or unsubstituted. Unless otherwise defined, the term "substituted" means that at least one hydrogen bonded to carbon is substituted with an element other than hydrogen, and for example, it means being substituted with an alkyl group having 1 to 20 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, a heterocycloalkyl group having 3 to 12 carbon atoms, a heterocycloalkenyl group having 3 to 12 carbon atoms, an aryloxy group having 6 to 12 carbon atoms, a halogen atom, a fluoroalkyl group having 1 to 20 carbon atoms, a nitro group, an aryl group having 6 to 20 carbon atoms, a heteroaryl group having 2 to 20 carbon atoms, a haloaryl group having 6 to 20 carbon atoms, etc.

Hereinafter, the present disclosure will be described in more detail.

Non-Aqueous Electrolyte

A non-aqueous electrolyte according to the present disclosure may include a polymer containing a repeating unit represented by Formula 1 and Formula 2 below. A secondary battery including the non-aqueous electrolyte of the present disclosure may have excellent high-temperature cycle characteristics and high-temperature storage characteristics since deterioration caused by interfacial reactions at high temperatures is suppressed.

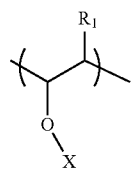

[Formula 1]

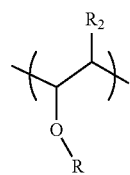

[Formula 2]

In addition, the repeating unit of Formula 1 contained in the polymer, which is provided as the additive for a non-aqueous electrolyte of the present disclosure, includes a perfluoroalkyl group, thereby a LiF inorganic material is easily produced, and thus it is possible to form a SEI layer based on a stable polymer-inorganic material. Therefore, it is possible to suppress the degradation in passivation ability of SEI at high temperatures, thereby preventing the negative electrode from deteriorating.

Moreover, the polymer, which is provided as the additive for a non-aqueous electrolyte of the present disclosure, includes a nitrile group in the repeating unit of Formula 2, and thus is well electro-deposited on a negative electrode, so that the SEI layer may be easily formed. Therefore, it is possible to rapidly form a robust SEI layer.

In Formula 1 above, X may be a perfluoroalkyl group having 1 to 10 carbon atoms. Preferably, X in Formula 1 above may be a linear or branched perfluoroalkyl group having 1 to 5 carbon atoms, and most preferably, X in Formula 1 above may be a linear perfluoroalkyl group having 1 to 3 carbon atoms.

In Formula 2 above, R may be an alkyl group having 1 to 10 carbon atoms which is substituted with at least one nitrile group. Preferably, R in Formula 2 above may be a linear or branched alkyl group having 1 to 5 carbon atoms which is substituted with at least one nitrile group, and most preferably, R in Formula 2 above may be an alkyl group having 1 to 3 carbon atoms which is substituted with at least one nitrile group.

In Formulae 1 and 2 above, $R_1$ and $R_2$ may be each independently any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group. Preferably, $R_1$ and $R_2$ in Formulae 1 and 2 above may be each independently any one selected from the group consisting of H and an alkyl group having 1 to 10 carbon atoms. Most preferably, $R_1$ and $R_2$ in Formulae 1 and 2 above may be H.

The non-aqueous electrolyte according to the present disclosure may include a polymer represented by Formula 3 below as an additive.

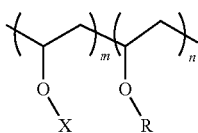

[Formula 3]

In Formula 3 above, X may be a perfluoroalkyl group having 1 to 10 carbon atoms. Preferably, X in Formula 3 above may be a linear or branched perfluoroalkyl group having 1 to 5 carbon atoms, and most preferably, X in Formula 3 above may be a linear perfluoroalkyl group having 1 to 3 carbon atoms.

In Formula 3 above, R may be an alkyl group having 1 to 10 carbon atoms which is substituted with at least one nitrile group. Preferably, R in Formula 3 above may be a linear or branched alkyl group having 1 to 5 carbon atoms which is substituted with at least one nitrile group, and most preferably, R in Formula 3 above may be an alkyl group having 1 to 3 carbon atoms which is substituted with at least one nitrile group.

In Formula 3 above, m and n may be each independently an integer of 1 to 100. Preferably, m may be an integer of 10 to 50, and n may be an integer of 60 to 100, and most preferably, m may be an integer of 10 to 30, and n may be an integer of 70 to 90. If m and n in Formula 3 above satisfies the above range, there is an advantage in that an amount of an inorganic material component such as LiF may be appropriately adjusted due to the additive of the present disclosure when the SEI layer based on the polymer-inorganic material is formed.

The additive for a non-aqueous electrolyte according to the present disclosure may be included in an amount of 0.01 parts by weight to 5 parts by weight, preferably 0.05 parts by weight to 2 parts by weight, and more preferably, 0.10 parts by weight to 1.5 parts by weight based on 100 parts by weight of the non-aqueous electrolyte. When the content of the polymer containing the repeating unit represented by Formula 1 and Formula 2 above satisfies the above range, the film-forming effect on the surface of the negative electrode is sufficient, and thus there is an effect of achieving excellent high-temperature service life characteristics and high-temperature storage characteristics.

The non-aqueous electrolyte according to the present disclosure may further include a lithium salt, an organic solvent, or other electrolyte additives.

The lithium salt is used as an electrolyte salt in the lithium secondary battery, wherein it is used as a medium for transferring ions. Typically, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_2^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2$ $(CF_3)_2CO^-$, $(CF_3SO_2)_2CH^-$, $CF_3$ $(CF_2)_7SO_3$, and $SCN^-$ as an anion.

Specifically, the lithium salt may include a single material selected from the group consisting of LiCl, LiBr, LiI, $LiBF_4$, $LiClO_4$, $LiB_{10}Cl_{10}$, $LiAlCl_4$, $LiAlO_2$, $LiPF_6$, $LiCF_3SO_3$, $LiCH_3CO_2$, $LiCF_3CO_2$, $LiAsF_6$, $LiSbF_6$, $LiCH_3SO_3$, $LiN(SO_2F)_2$ (lithium bis(fluorosulfonyl)imide, LiFSI), $LiN(SO_2CF_2CF_3)_2$ (lithium bis(perfluoroethanesulfonyl)imide, LiBETI), and $LiN(SO_2CF_3)_2$ (lithium bis(trifluoromethanesulfonyl)imide, LiTFSI) or a mixture of two or more thereof. In addition to the above, any lithium salt commonly used in an electrolyte of a lithium secondary battery may be used without limitation.

The lithium salt may be appropriately changed in a normally usable range, but may be included in a concentration of 0.5 M to 4.0 M, preferably, 1.0 M to 3.0 M, and more preferably, 1.5 M to 2.0 M in the electrolyte in order to obtain an optimum effect of forming a film for preventing corrosion on the surface of an electrode. When the concentration of the lithium salt satisfies the above range, there is a sufficient effect of improving cycle characteristics during high-temperature storage of a lithium secondary battery, and the viscosity of the non-aqueous electrolyte is suitable, so that the impregnability of the electrolyte may be improved.

The non-aqueous organic solvent may include at least one organic solvent selected from the group consisting of a cyclic carbonate-based organic solvent, a linear carbonate-based organic solvent, a linear ester-based organic solvent, and a cyclic ester-based organic solvent.

The additive according to the present disclosure is effective particularly in the case of using the cyclic carbonate solvent. When a conventional electrolyte additive is used in conjunction with the cyclic carbonate solvent, the SEI film formed by the decomposition of the cyclic carbonate solvent has had a problem in that it is difficult to maintain the SEI film due to a change in volume of the negative electrode, which occurs during cycles, and thus the solvent is continually decomposed. Thus, there has been a problem in that the ionic conductivity of the electrolyte is reduced, and thus the cycle characteristics are deteriorated. However, when the polymer according to the present disclosure is used as an additive in conjunction with the cyclic carbonate solvent, it is possible to form a robust SEI film, and thus there is an effect of maintaining cycle characteristics high.

The cyclic carbonate-based organic solvent is an organic solvent which may well dissociate the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), fluoro ethylene carbonate (FEC), 1,2-butylene carbonate, 2,3-butylene carbonate, 1,2-pentylene carbonate, 2,3-pentylene carbonate, and vinylene carbonate (VC), and, among them, the cyclic carbonate-based organic solvent may include fluoro ethylene carbonate (FEC).

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include diethyl carbonate (DEC).

Furthermore, the organic solvent may further include at least one ester-based organic solvent selected from the group consisting of a linear ester-based organic solvent and a cyclic ester-based organic solvent in addition to at least one carbonate-based organic solvent selected from the group consisting of the cyclic carbonate-based organic solvent and the linear carbonate-based organic solvent, in order to prepare an electrolyte having high ionic conductivity.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

Meanwhile, if necessary, any organic solvent commonly used in a non-aqueous electrolyte may be additionally used without limitation as the organic solvent. For example, at least one organic solvent among an ether-based organic solvent, a glyme-based organic solvent, and a nitrile-based organic solvent may be further included.

As the ether-based solvent, any one selected from the group consisting of dimethyl ether, diethyl ether, dipropyl ether, methyl ethyl ether, methyl propyl ether, ethyl propyl ether, 1,3-dioxolane (DOL), and 2,2-bis(trifluoromethyl)-1,3-dioxolane (TFDOL) or a mixture of two or more thereof may be used, but the ether-based solvent is not limited thereto.

The glyme-based organic solvent is a solvent having higher dielectric constant and lower surface tension than the linear carbonate-based organic solvent and having lower reactivity with metal, wherein the glyme organic solvent may include at least one selected from the group consisting of dimethoxyethane (glyme, DME), diglyme, triglyme, and tetraglyme (TEGDME), but the glyme organic solvent is not limited thereto.

The nitrile-based organic solvent may include at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile, but the nitrile organic solvent is not limited thereto.

In addition, the non-aqueous electrolyte of the present disclosure may further include, if necessary, an electrolyte additive known in the art in the non-aqueous electrolyte in order to prevent the non-aqueous electrolyte from being decomposed in a high-output environment and causing a negative electrode to collapse, or to further improve low-temperature high-rate discharge characteristics, high-temperature stability, overcharge prevention, an effect of suppressing battery expansion at high temperatures, and the like.

Representative examples of the additional electrolyte additive may include at least one additive for forming an SEI film selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

The cyclic carbonate-based compound may include vinylene carbonate (VC) or vinyl ethylene carbonate.

The halogen-substituted carbonate-based compound may include fluoroethylene carbonate (FEC).

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound may include ethylene sulfate (Esa), trimethylene sulfate (TMS), or methyl trimethylene sulfate (MTMS).

The phosphate-based compound may include at least one compound selected from the group consisting of lithium difluorobis(oxalato)phosphate, lithium difluorophosphate, tetramethyl trimethylsilyl phosphate, trimethylsilyl phosphite, tris(2,2,2-trifluoroethyl)phosphate, and tris(trifluoroethyl)phosphite.

The borate-based compound may include tetraphenylborate, lithium oxalyldifluoroborate (LiODFB), or lithium bis(oxalato)borate (LiB($C_2O_4$)$_2$, LiBOB).

The nitrile-based compound may include at least one compound selected from the group consisting of succinonitrile, adiponitrile, acetonitrile, propionitrile, butyronitrile, valeronitrile, caprylonitrile, heptanenitrile, cyclopentanecarbonitrile, cyclohexanecarbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound may include fluorobenzene, the amine-based compound may include triethanolamine or ethylenediamine, and the silane-based compound may include tetravinylsilane.

The lithium salt-based compound is a compound different from the lithium salt included in the non-aqueous electrolyte, and may be lithium difluorophosphate (LiDFP), $LiPO_2F_2$, $LiBF_4$, or the like.

Among the additional electrolyte additives, when a combination of vinylene carbonate (VC), 1,3-propane sultone (PS), ethylene sulfate (Esa), and lithium difluorophosphate (LiDFP) is further included, it is possible to form a more robust SEI film on the surface of a negative electrode during an initial activation process of a secondary battery, and to suppress the generation of a gas which may be generated due to the decomposition of an electrolyte at high temperatures, thereby improving high-temperature stability of the secondary battery.

Meanwhile, the additional additives may be used as a mixture of two or more thereof, and may be included in an amount of 0.050 wt % to 20 wt %, particularly 0.10 wt % to 15 wt %, and preferably 0.30 wt % to 10 wt % based on a total weight of the non-aqueous electrolyte. When the content of the additional electrolyte additives satisfies the above range, there is a more excellent effect of improving ionic conductivity and cycle characteristics.

Lithium Secondary Battery

The present disclosure also provides a lithium secondary battery including the non-aqueous electrolyte.

Specifically, the lithium secondary battery includes a positive electrode including a positive electrode active material, a negative electrode including a negative electrode active material, a separator disposed between the positive electrode and the negative electrode, and the above-described non-aqueous electrolyte.

In this case, the lithium secondary battery of the present disclosure may be prepared according to a typical method known in the art. For example, after an electrode assembly is formed by sequentially stacking a positive electrode, a negative electrode, and a separator disposed between the positive electrode and the negative electrode, the lithium secondary battery of the present disclosure may be prepared by inserting the electrode assembly into a battery case, and injecting the non-aqueous electrolyte according to the present disclosure.

(1) Positive Electrode

The positive electrode may be prepared by coating a positive electrode collector with a positive electrode material mixture slurry including a positive electrode active material, a binder, a conductive agent, and a solvent.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. More specifically, the lithium metal oxide may include a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), a lithium-nickel-cobalt-based oxide (e.g., $LiNi_{1-Y1}Co_{Y1}O_2$ (where $0<Y1<1$), etc.), a lithium-manganese-cobalt-based oxide (e.g., $LiCo_{1-Y2}Mn_{Y2}O_2$ (where $0<Y2<1$), $LiMn_{2-z1}Co_{z1}O_4$ (where $0<Z1<2$), etc.), a lithium-nickel-manganese-cobalt-based oxide (e.g., $Li(Ni_pCo_qMn_r)O_2$ (where $0<p<1$, $0<q<1$, $0<r<1$, and $p+q+r=1$) or $Li(Ni_{p1}Co_{q1}Mn_{r1})O_4$ (where $0<p1<2$, $0<q1<2$, $0<r1<2$, and $p1+q1+r1=2$), etc.), or a lithium-nickel-cobalt-transition metal (M) oxide (e.g., $Li(Ni_{p2}Co_{q2}Mn_{r2}M_{s2})O_2$ (where M is selected from the group consisting of Al, Fe, V, Cr, Ti, Ta, Mg, and Mo, and p2, q2, r2, and s2 are atomic fractions of each independent elements, wherein $0<p2<1$, $0<q2<1$, $0<r2<1$, $0<S2<1$, and $p2+q2+r2+S2=1$), etc.), and any one thereof or a compound of two or more thereof may be included.

Among these materials, in terms of the improvement of capacity characteristics and stability of the battery, the lithium metal oxide may include $LiCoO_2$, $LiMnO_2$, $LiNiO_2$, a lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, etc.), a lithium nickel cobalt aluminum oxide (e.g., $Li(Ni_{0.8}Co_{0.15}Al_{0.05})O_2$, etc.), or the like, and any one thereof or a mixture of two or more thereof may be used.

The positive electrode active material may be included in an amount of 60 wt % to 99 wt %, preferably 70 wt % to 99 wt %, and more preferably 80 wt % to 98 wt % based on a total weight of solids excluding the solvent in the positive electrode material mixture slurry.

The binder is a component that assists in the binding between the active material and the conductive agent and in the binding with the current collector.

Examples of the binder may include polyvinylidene fluoride, polyvinyl alcohol, starch, hydroxypropylcellulose, regenerated cellulose, polyvinylpyrrolidone, polytetrafluoroethylene, polyethylene (PE), polypropylene, an ethylene-propylene-diene monomer, a sulfonated ethylene-propylene-diene monomer, a styrene-butadiene rubber, a fluoro rubber, various copolymers, and the like.

The binder may be commonly included in an amount of 1 wt % to 20 wt %, preferably 1 wt % to 15 wt %, and more preferably 1 wt % to 10 wt % based on the total weight of solid in excluding the solvent in the positive electrode material mixture slurry.

The conductive agent is a component for further improving the conductivity of the positive electrode active material, and may be added in an amount of 1 wt % to 20 wt % based on the total weight of the solid content in the positive electrode material mixture slurry. The conductive agent is not particularly limited as long as it has conductivity without causing adverse chemical changes in the battery, and, for example, a conductive material, such as: carbon powder such as carbon black, acetylene black, Ketjen black, channel black, furnace black, lamp black, and thermal black; graphite powder such as natural graphite with a well-developed crystal structure, artificial graphite, and graphite; conductive fibers such as carbon fibers and metal fibers; conductive powder such as fluorocarbon powder, aluminum powder, and nickel powder; conductive whiskers such as zinc oxide whiskers and potassium titanate whiskers; conductive metal oxide such as titanium oxide; and polyphenylene derivatives, may be used.

The conductive agent may be commonly included in an amount of 1 wt % to 20 wt %, preferably 1 wt % to 15 wt %, and more preferably 1 wt % to 10 wt % based on the total weight of solids excluding the solvent in the positive electrode material mixture slurry.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of a solid content including the positive electrode active material as well as selectively the binder and the conductive agent is in a range of 50 wt % to 95 wt %, preferably 70 wt % to 95 wt %, and more preferably 70 wt % to 90 wt %.

(2) Negative Electrode

The negative electrode, for example, may be prepared by coating a negative electrode collector with a negative electrode material mixture slurry including a negative electrode active material, a binder, a conductive agent, and a solvent, or a graphite electrode formed of carbon (C) or a metal itself may be used as the negative electrode.

For example, in a case in which the negative electrode is prepared by coating the negative electrode collector with the negative electrode material mixture slurry, the negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, and a non-woven fabric body.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may include graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of Cu, Ni, Na, K, Rb, Cs, Fr, Be, Mg, Ca, Sr, Si, Sb, Pb, In, Zn, Ba, Ra, Ge, Al, and Sn, or an alloy of lithium and the metal may be used.

As the metal or the alloy of lithium and the metal, a metal selected from the group consisting of Cu, Ni, Na, K, Rb, Cs, Fr, Be, Mg, Ca, Sr, Si, Sb, Pb, In, Zn, Ba, Ra, Ge, Al, and Sn, or an alloy of lithium and the metal may be used.

One selected from the group consisting of PbO, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \le x \le 1$), $Li_xWO_2$ ($0 \le x \le 1$), and $Sn_xMe_{1-x}Me'_yO_z$ (Me: Mn, Fe, Pb, Ge; Me': Al, B, P, Si, Groups I, II and III elements of the periodic table, or halogen; $0<x\le1$; $1\le y\le3$; $1\le z\le8$) may be used as the metal composite oxide.

The material, which may be doped and undoped with lithium, may include Si, $SiO_x$ ($0<x\le2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may include lithium-containing titanium composite oxide (LTO), vanadium oxide, and lithium vanadium oxide.

The additive according to the present disclosure is effective particularly when Si or $SiO_x$ ($0<x\le2$) is used as a negative electrode active material. Specifically, when a Si-based negative electrode active material is used, the degradation of service life characteristics is promoted by extreme expansion/contraction of volume during cycles if a robust SEI layer is not formed on the surface of a negative electrode during an initial activation process. However, the additive according to the present disclosure is capable of forming an elastic and robust SEI layer, thereby making the secondary battery using the Si-based negative electrode active material have excellent service life and storage characteristics.

The negative electrode active material may be included in an amount of 50 wt % to 99 wt %, preferably 60 wt % to 99 wt %, and more preferably 70 wt % to 98 wt % based on a total weight of the solid content in the negative electrode material mixture slurry.

Examples of the binder may include polyvinylidene fluoride (PVDF), polyvinyl alcohol, starch, hydroxypropylcellulose, regenerated cellulose, polyvinylpyrrolidone, polytetrafluoroethylene, polyethylene, polypropylene, an ethylene-propylene-diene monomer, a sulfonated ethylene-propylene-diene monomer, a styrene-butadiene rubber, a fluoro rubber, and various copolymers thereof. Specifically, styrene butadien rubber (SBR)-carboxylmethyl cellulose (CMC) may be used in terms of high thickening properties.

The binder may be commonly included in an amount of 1 wt % to 20 wt %, preferably 1 wt % to 15 wt %, and more preferably 1 wt % to 10 wt % based on the total weight of solids excluding the solvent in the negative electrode material mixture slurry.

The conductive agent is a component for further improving the conductivity of the negative electrode active material, and may be added in an amount of 1 wt % to 20 wt % based on the total weight of the solid content in the negative electrode material mixture slurry. The conductive agent is not particularly limited as long as it has conductivity without causing adverse chemical changes in the battery, and, for example, a conductive material, such as: carbon powder such as carbon black, acetylene black, Ketjen black, channel black, furnace black, lamp black, and thermal black; graphite powder such as natural graphite with a well-developed crystal structure, artificial graphite, and graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; and polyphenylene derivatives, may be used.

The conductive agent may be included in an amount of 1 wt % to 20 wt %, preferably 1 wt % to 15 wt %, and more preferably 1 wt % to 10 wt % based on the total weight of solids excluding the solvent in the negative electrode material mixture slurry.

The solvent may include water or an organic solvent, such as N-methyl-2-pyrrolidone (NMP), and may be used in an amount such that desirable viscosity is obtained when the negative electrode active material as well as optionally the binder and the conductive agent is included. For example, the solvent may be included in an amount such that a concentration of a solid content including the negative electrode active material as well as optionally the binder and the conductive agent is in a range of 50 wt % to 95 wt %, for example, 70 wt % to 90 wt %.

In a case in which the metal itself is used as the negative electrode, the negative electrode may be prepared by a method of physically bonding, rolling, or depositing a metal on a metal thin film itself or the negative electrode collector. The depositing method may use an electrical deposition method or chemical deposition method of metal.

For example, the metal bonded/rolled/deposited on the metal thin film itself or the negative electrode collector may include one metal selected from the group consisting of lithium (Li), nickel (Ni), tin (Sn), copper (Cu), and indium (In) or an alloy of two metals thereof.

(3) Separator

Also, a typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylenemethacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present disclosure is not limited thereto. Furthermore, a coated separator including a ceramic component or a polymer material may be used to secure heat resistance or mechanical strength, and the separator having a single layer or multilayer structure may be optionally used.

Specifically, a safety reinforced separator (SRS) on which a coating layer including a ceramic component or a polymer material is formed may be used as separators included in the electrode assembly of the present disclosure in order to secure heat resistance or mechanical strength.

Specifically, the separators included in the electrode assembly of the present disclosure may include a porous separator substrate, and a porous coating layer entirely coated on one surface or both surfaces of the separator substrate, and the coating layer may include a mixture of inorganic particles selected from a metal oxide, a metalloid oxide, a metal fluoride, a metal hydroxide, and a combination thereof, and a binder polymer for connecting and fixing the inorganic particles to each other.

The coating layer may include, as the inorganic particles, at least one selected from $Al_2O_3$, $SiO_2$, $TiO_2$, $SnO_2$, $CeO_2$, MgO, NiO, CaO, ZnO, $ZrO_2$, $Y_2O_3$, $SrTiO_3$, $BaTiO_3$, $Mg(OH)_2$, or MgF. Here, the inorganic particles may improve thermal stability of the separator. That is, the inorganic particles may prevent the separator from being contracted at high temperatures. In addition, the binder polymer may improve mechanical stability of the separator by fixing the inorganic particles.

A shape of the lithium secondary battery of the present disclosure is not particularly limited, but a cylindrical type using a can, a prismatic type, a pouch type, or a coin type may be used.

Hereinafter, the present disclosure will be described in more detail with reference to specific examples. However, the following examples are merely presented to exemplify the present disclosure, and the scope of the present disclosure is not limited thereto. It will be apparent to those skilled in the art that various modifications and alterations are possible within the scope and technical spirit of the present disclosure. Such modifications and alterations fall within the scope of claims included herein.

SYNTHETIC EXAMPLES

In an argon (Ar) environment, AgOTf (4.0 mmol), KF (6.0 mmol), 2-fluoropyridine (4.0 mmol), and $TMSCF_3$ (4.0 mmol) were added in EtOAc solvent and the resulting mixture was stirred at room temperature for 12 hours. Selectfluor (3.0 mmol) was added thereto and reacted, and PVA-CN (0.02 mol) was then added thereto and reacted. After the reaction was terminated, AgF by-products were filtered and the remaining polymer solution was precipitated in distilled water, and then the precipitate was dried in vacuum to obtain a polymer. The obtained polymer was a material represented by Formula 3.

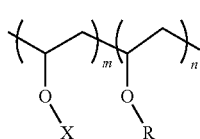

[Formula 3]

(X is $CF_3$, R is $CH_2CH_2CN$, m is 20, and n is 80)

EXAMPLES

Example 1

Preparation of Non-Aqueous Electrolyte

A non-aqueous solvent was prepared by dissolving $LiPF_6$ to 1.5 M in an organic solvent (fluoro ethylene carbonate (FEC):diethyl carbonate (DEC)=10:90 volume ratio), and 0.1 g of a polymer of Formula 3 below was introduced to 99.9 g of the non-aqueous solvent, thereby preparing a non-aqueous electrolyte.

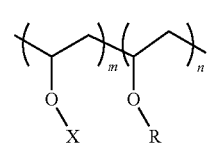

[Formula 3]

(X is $CF_3$, R is $CH_2CH_2CN$, m is 20, and n is 80)

(Manufacture of Lithium Secondary Battery)

A positive electrode active material ($LiNi_{0.85}Co_{0.05}Mn_{0.08}Al_{0.02}O_2$), a conductive agent (carbon nanotube), and a binder (polyvinylidene fluoride) were added to N-methyl-2-pyrrolidone (NMP), which was a solvent, in a weight ratio of 97.74:0.7:1.56 to prepare a positive electrode slurry (solid content 75.5 wt %). The positive electrode slurry was applied on one surface of a positive electrode collector (Al thin film) having a thickness of 15 μm, dried, and roll-pressed to prepare a positive electrode.

A negative electrode active material (silicon; Si), a conductive agent (carbon black), and a binder (styrene-butadien rubber(SBR)-carboxylmethyl cellulose (CMC)) were added in a weight ratio of 70:20.3:9.7 to N-methyl-2-pyrrolidone (NMP), which was a solvent, to prepare a negative electrode slurry (solid content 26 wt %). The negative electrode slurry was applied on one surface of a negative electrode current collector (Cu thin film) having a thickness of 15 μm, dried, and roll-pressed to prepare a negative electrode.

In a dry room, a polyolefin-based porous separator on which inorganic particles $Al_2O_3$ were applied was disposed between the positive electrode and the negative electrode prepared above, and then the prepared non-aqueous electrolyte was injected thereto to manufacture a secondary battery.

Example 2

A secondary battery was manufactured in the same manner as in Example 1 except that 0.3 g of the polymer of Formula 3 above was introduced to 99.7 g of the non-aqueous solvent prepared in Example 1 to prepare a non-aqueous electrolyte.

Example 3

A secondary battery was manufactured in the same manner as in Example 1 except that 0.5 g of the polymer of Formula 3 above was introduced to 99.5 g of the non-aqueous solvent prepared in Example 1 to prepare a non-aqueous electrolyte.

Example 4

A secondary battery was manufactured in the same manner as in Example 1 except that 1.0 g of the polymer of Formula 3 above was introduced to 99.0 g of the non-aqueous solvent prepared in Example 1 to prepare a non-aqueous electrolyte.

Example 5

A non-aqueous solvent was prepared by dissolving LiPF$_6$ to 1.5 M in an organic solvent (fluoro ethylene carbonate (FEC):diethyl carbonate (DEC)=10:90 volume ratio), and 0.1 g of a polymer of Formula 3 below was introduced to 99.9 g of the non-aqueous solvent, thereby preparing a non-aqueous electrolyte.

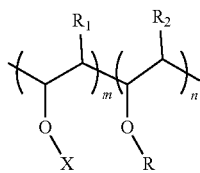

[Formula 4]

($R_1$ is $CH_3$, $R_2$ is $OCH_3$, X is $CF_3$, R is $CH_2CH_2CN$, m=20, n=80)

A secondary battery was manufactured in the same manner as in Example 1 except above mentioned non-aqueous electrolyte was used.

Example 6

A non-aqueous solvent was prepared by dissolving LiPF$_6$ to 1.5 M in an organic solvent (fluoro ethylene carbonate (FEC):diethyl carbonate (DEC)=10:90 volume ratio), and 0.1 g of a polymer of Formula 3 below was introduced to 99.9 g of the non-aqueous solvent, thereby preparing a non-aqueous electrolyte.

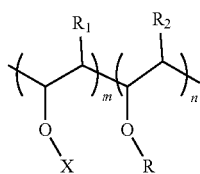

[Formula 4]

($R_1$ is F, $R_2$ is $CH_2CHCH_2$, X is $CF_3$, R is $CH_2CH_2CN$, m=20, n=80)

A secondary battery was manufactured in the same manner as in Example 1 except above mentioned non-aqueous electrolyte was used.

Comparative Example 1

A secondary battery was manufactured in the same manner as in Example 1 except that 100 g of the non-aqueous solvent prepared in Example 1 was used to prepare a non-aqueous electrolyte.

Experimental Example 1—Evaluation of High-Temperature Cycle Characteristics

For each of the secondary batteries manufactured in Examples 1 to 4 and Comparative Example 1, cycle characteristics were evaluated.

Specifically, each of the batteries manufactured in Examples 1 to 4 and Comparative Example 1 was charged to 4.2 V with a constant current of 1 C at 45° C., and then discharged to 3.0 V with a constant current of 0.5 C, which was set as one cycle, and then 250 cycles of the charge and discharge were performed, and then a capacity retention was measured based on an initial capacity after one cycle. The results are listed in Table 1 below:

TABLE 1

|  | Capacity retention (%) |
| --- | --- |
| Example 1 | 76.9 |
| Example 2 | 77.8 |
| Example 3 | 79.1 |
| Example 4 | 79.5 |
| Example 5 | 75.2 |
| Example 6 | 77.3 |
| Comparative Example 1 | 73.9 |

As shown in Table 1, Examples 1 to 4 in which the additive for a non-aqueous electrolyte of the present disclosure was used had higher capacity retention than that of Comparative Example 1 in which the additive was not used, and thus had excellent service life characteristics.

Experimental Example 2—Evaluation of High-Temperature Storage Characteristics For each of the secondary batteries manufactured in Examples 1 to 4 and Comparative Example 1, high-temperature storage characteristics were evaluated.

Specifically, the secondary batteries of Examples 1 to 4 and Comparative Example 1 were each fully charged to 4.2 V, and then stored at 60° C. for 8 weeks.

Before the storage, the resistance of each of the fully-charged secondary batteries was measured and then set as an initial resistance of the secondary battery.

After 8 weeks, the resistance of each of the stored batteries was measured to calculate a resistance increased during the 8-week storage period. The percentage of the increased resistance to the initial resistance of the secondary battery was calculated to derive a resistance increase rate after 8 weeks. The results are listed in Table 2 below:

TABLE 2

|  | Resistance increase rate (%) |
| --- | --- |
| Example 1 | 29.5 |
| Example 2 | 22.6 |
| Example 3 | 21.0 |
| Example 4 | 8.3 |
| Example 5 | 35.8 |
| Example 6 | 26.4 |
| Comparative Example 1 | 45.4 |

As shown in Table 2 above, it was confirmed that the secondary batteries of Examples 1 to 4 had a lower resistance increase rate after 8 weeks than that of the secondary battery of Comparative Example 1, and thus had stable performance at high temperatures.

What is claimed is:

1. A non-aqueous electrolyte comprising an additive comprising a repeating unit represented by Formula 1 and a repeating unit represented by Formula 2:

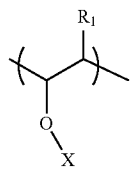

[Formula 1]

wherein, in Formula 1, X is a perfluoroalkyl group having 1 to 10 carbon atoms, and $R_1$ is any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group, and

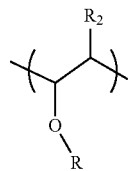

[Formula 2]

wherein, in Formula 2 above, R is an alkyl group having 1 to 10 carbon atoms which is substituted with at least one nitrile group, and $R_2$ is any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group.

2. The non-aqueous electrolyte of claim 1, wherein the additive is represented by Formula 3:

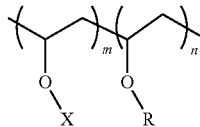

[Formula 3]

wherein, in Formula 3, X is a perfluoroalkyl group having 1 to 10 carbon atoms,

R is an alkyl group having 1 to 10 carbon atoms which is substituted with at least one nitrile group, and m and n are each independently an integer of 1 to 100.

3. The non-aqueous electrolyte of claim 1, wherein X is $CF_3$, and R is $CH_2CH_2CN$.

4. The non-aqueous electrolyte of claim 2, wherein X is $CF_3$, and R is $CH_2CH_2CN$.

5. The non-aqueous electrolyte of claim 2, wherein m is an integer of 10 to 50, and n is an integer of 60 to 100.

6. The non-aqueous electrolyte of claim 1, wherein the additive is contained in an amount of 0.01 parts by weight to 5 parts by weight based on 100 parts by weight of the non-aqueous electrolyte.

7. The non-aqueous electrolyte of claim 1, further comprising at least one lithium salt selected from the group consisting of LiCl, LiBr, LiI, $LiBF_4$, $LiClO_4$, $LiB_{10}Cl_{10}$, $LiAlCl_4$, $LiAlO_2$, $LiPF_6$, $LiCF_3SO_3$, $LiCH_3CO_2$, $LiCF_3CO_2$, $LiAsF_6$, $LiSbF_6$, $LiCH_3SO_3$, $LiN(SO_2F)_2$, $LiN(SO_2CF_2CF_3)_2$, and $LiN(SO_2CF_3)_2$.

8. The non-aqueous electrolyte of claim 7, wherein the lithium salt is contained in a concentration of 0.5 M to 4.0 M.

9. The non-aqueous electrolyte of claim 1, further comprising an organic solvent.

10. The non-aqueous electrolyte of claim 9, wherein the organic solvent comprises a cyclic carbonate-based organic solvent.

11. The non-aqueous electrolyte of claim 10, wherein the cyclic carbonate-based organic solvent is fluoro ethylene carbonate (FEC).

12. The non-aqueous electrolyte of claim 1, further comprising, as an additive, at least one compound selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

13. A lithium secondary battery comprising:
a positive electrode;
a negative electrode; and
a non-aqueous electrolyte of claim 1.

14. The lithium secondary battery of claim 13, wherein the negative electrode comprises $SiO_x$ (0≤x≤2) as a negative electrode active material.

15. The lithium secondary battery of claim 13, wherein the additive is represented by Formula 3:

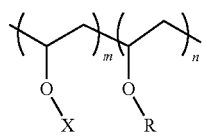

[Formula 3]

wherein, in Formula 3, X is $CF_3$, R is $CH_2CH_2CN$, and m and n are each independently an integer of 1 to 100.

* * * * *